March 3, 1964 R. I. MORLEY ETAL 3,123,269

HANDLER FOR FOLDING TAPE

Filed May 25, 1959 2 Sheets-Sheet 1

INVENTORS
ROBERT I. MORLEY
WILLIAM A. FARRAND
BY
John A. Duffy
AGENT

INVENTOR.
ROBERT I. MORLEY
WILLIAM A. FARRAND
BY John A. Duffy
AGENT 3,123,269

HANDLER FOR FOLDING TAPE

Robert I. Morley, Norwalk, and William A. Farrand, Downey, Calif., assignors to North American Aviation, Inc.

Filed May 25, 1959, Ser. No. 815,459
5 Claims. (Cl. 226—118)

Figure 1:
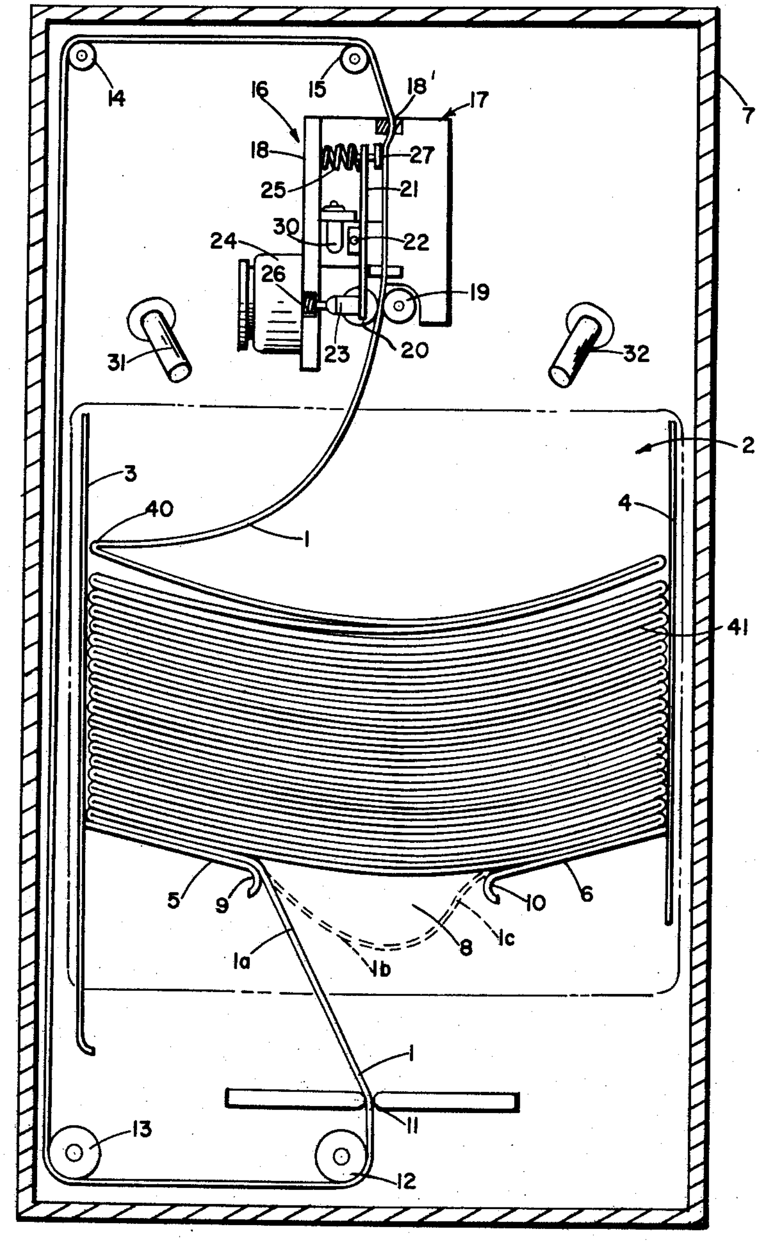

This invention relates to signal recording and reproducing means and more particularly to an automatic photoelectric tape handler utilizing endless tape records folded in an accordion-pleated fashion to provide long periods of fast reproducing.

Digital computers require reading means for filling problem data and program or problem solutions into the computer memory means. Accordingly, a tape handler utilized as an input device for memory filling of a digital computer is required to handle digital information at a fast rate in addition to being versatile and reliable in order to meet the precision requirements of present-day digital computers. Further, in lieu of the continuing drive toward simplicity and compactness of structure in digital computers, a tape handler is required which can handle many feet of tape in as compact a structure as possible. In addition, the tape handler must be simple and inexpensive to produce.

Present-day tape handlers fail to meet the increasing requirements of simplicity and versatility necessary in today's digital computers. A common tape handler utilized universally today is the linear tape record system wherein a two-ended length of recording tape stored on a supply reel is fed from the reel past a read head to a take-up reel to be temporarily stored thereon as the supply reel is being unwound. After the entire record has been reproduced the tape is then rewound onto the original supply reel. It is obvious that a particular disadvantage of this system is the difficulty of handling and using a two-ended length of tape which is especially accentuated when the quantity of data is sufficient to require several hundred feet of tape. Thus a tape handler having two reels as storage devices for the tape wherein the tape is extracted from one of the reels, passed over the recording mechanism, and deposited on the other reel necessarily has a limited acceleration and velocity due to the inertia of the reels. These tape handlers additionally are inherently bulky due to the size of the reels necessary to accommodate relatively small amounts of tape. An attempt to overcome the disadvantages of the storage reel handling systems has been made utilizing an endless belt record system wherein a relatively long endless belt record is stretched taut only a part of its length by an arrangement which drives this portion with uniform speed and alignment. The remainder of the record is stored in accordion-pleated folds in a storage device which insures that the belt record remains uniformly and evenly folded as it passes continuously through this storage arrangement. A particular disadvantage of accordion-pleated endless belt handling system of the prior art lies in the fact that in order to insure that the tape refolds properly on the accordion-pleated platform thereof after the tape has passed through the reproducing or recording means, it is essential that the original creases or folds on the tape as it is stored must be maintained. Since no mechanical apparatus is used to refold the tape in such a system, the physical properties of the tape must be utilized to achieve this end. In prior art endless belt record systems, supplementary folds originate as the tape is extracted from the storage compartment. The supplementary folds prevent the tape from refolding properly in the storage compartment after the tape has passed the reading station.

The tape handler of the present invention overcomes the disadvantages of linear handling systems by a simple and compact endless tape handler with storage means provided for storing the tape in a stacked-fold fashion as it leaves the reproducer or recorder. New and novel structure is provided for folding the tape in a fashion so that when the tape is extracted from the storage compartment, supplementary folds are not created.

In accordance with the present invention there is provided in a preferred embodiment thereof a photoelectric folded tape reproducing device wherein information on a tape is sensed by a reading means, the tape is then stored in stacked folds, which may be described generally as accordion-pleated, in a storage compartment especially designed so that original folds are maintained as the tape endlessly is read and stored, preventing supplementary folds thereon. Additionally, storage means include new and novel structure for extracting the tape and feeding it to the reading means in a fast and efficient manner. An inherently simple and inexpensive to produce structure is provided which will handle a great many feet of tape in a fast manner.

The tape reading devices of this invention in a preferred embodiment thereof essentially comprises a tape record creased across its width at speed intervals along its length, means for storing the tape in an accordion-pleated fashion so that as the tape is extracted from the storage means no supplementary folds are introduced thereon, and means for feeding the tape to a reading means in a fast and efficient manner.

It is therefore an object of this invention to provide an improved record tape handler.

It is another object of this invention to provide an improved endless tape reproducer with means for folding the tape in accordion-pleated fashion.

It is still another object of this invention to provide a photoelectric folded tape reader.

It is a further object of this invention to provide an endless belt record with the storage means for holding the tape in accordion-pleated fashion.

Figure 2:
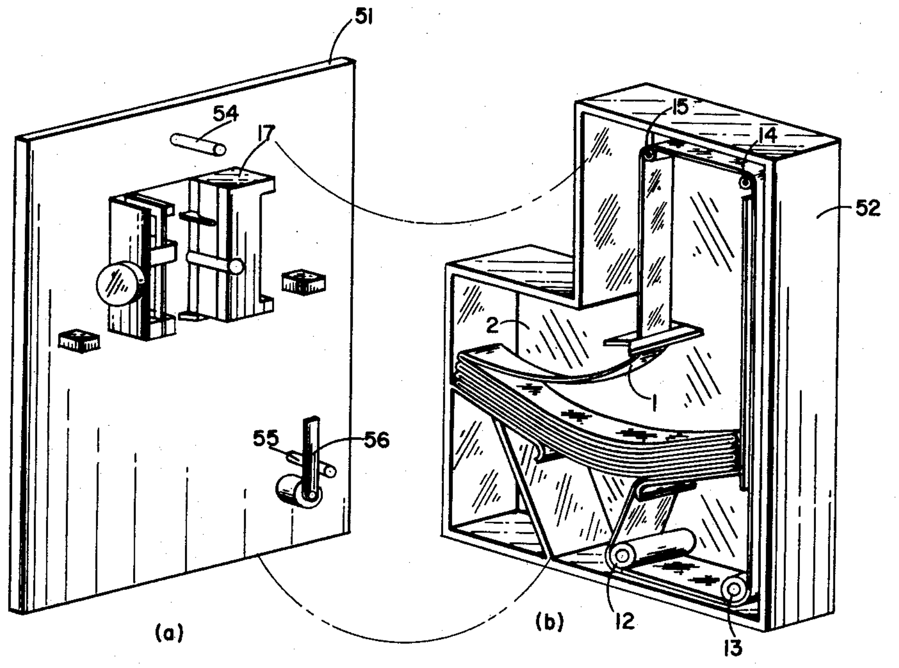

Other objects will become apparent from the following description taken in connection with the accompanying drawings in which FIG. 1 shows a side view of the handler of this invention in accordance with a preferred embodiment of the invention;

FIG. 2 illustrates in perspective an opened view of the handler of this invention.

Referring now in particular to FIG. 1 of the drawings, the illustrative embodiment shown therein is a photoelectric endless tape record machine having tape 1, which may be, for example, folded perforated paper tape, folded at evenly spaced creases along its length so as to be adapted to fold in stacks into storage compartment 2. Paper tape 1 is retained in the area in storage compartment 2 defined by left and right vertical walls 3 and 4 and platform supports 5 and 6. Vertical walls 3 and 4 are attached to a suitable frame means 7 and are vertically adjustable depending on the tape stored in compartment 2. Platforms 5 and 6 each have an upper end rigidly attached to vertical walls 3 and 4 respectively, and a lower end centrally depressed so as to form a gravity type holder for tape 1. Platforms 5 and 6 extend inwardly from vertical walls 3 and 4 a predetermined distance allowing an opening 8 for tape 1 to pass through when being extracted from storage compartment 2. Each of platform supports 5 and 6 at their lower ends have curved portions 9 and 10 respectively connected to curve downward to further the extraction of tape 1 from compartment 2. Tape 1 is extracted through opening 8 and is threaded through suitable aperture means 11 which guides the tape to guide rollers 12 and 13 at the lower end of frame 7. Guide rollers 14 and 15 receive tape 1 from guide rollers 12 and 13, with guide roller 15 feeding the tape into rocker assembly 16 past read head mechanism 17. Rocker assembly 16 has its base 18 slidably attached to frame 7 for adjustment purposes. At the upper end of mechanism 17 aperture 18' is adapted to receive tape 1 from roller 15. Tape 1 is drawn past read head mechanism 17 and returned to storage compartment 2.

The reproducing mechanism which receives the tape from roller 15 records the information on the tape, returning the tape to storage compartment 2, more specifically comprises capstan roller 19 continuously driven by a motor (not shown). Pressure roller 20 serves to hold the tape 1 in place as it passes between rollers 19 and 20. The movement of tape 1 is controlled by a positive action drive brake toggle system consisting of a rocker arm 21 of suitable resilient metal material which pivots about pivot point 22. One end of rocker arm 21 is rigidly attached to yoke 23. Yoke 23 is actuated by solenoid 24 through spring 26 which controls the maximum pressure exerted against roller 19 by rocker 16. The other end of rocker arm 21 is coupled to frame 16 by coil spring 25. Brake pad 27 is attached to the other end of rocker arm 21 to brake tape 1. Solenoid 24, suitably attached to frame 16, controls the action of pressure roller 20 by causing rocker arm 21 to pivot about point 22 braking tape 1 when de-energized and driving tape 1 when energized. When solenoid 24 is de-energized by suitable manual or automatic means, coil spring 25 forces brake pad 27 against tape 1 and holds the tape fast. This action removes pressure roller 20 from the tape and thus prevents any tape drive action. When solenoid 24 is energized pressure roller 20 is forced against tape 1 squeezing the tape against capstan 19 with a force equal to the difference between the forces exerted by springs 25 and 26. This action simultaneously removes brake pad 27 from tape 1, permitting the tape to be driven through read head mechanism 17. As shown in FIG. 1, the read mechanism is a photoelectric system utilizing perforated paper tape 1. As tape 1 passes over the read mechanism 17, suitable lamp means 30, and associated transducing means read the information stored on the paper tape by means well known in the recording art. It is to be noted that the read mechanism shown is for illustration purposes only. Any number of reproducing mechanisms can be utilized with the paper tape shown. In addition, tape 1 could comprise magnetic tape or any other folding record medium with suitable recording or reproducing mechanisms well known in the art adapted to read or record information thereon as the medium passes from roller 20 into storage compartment 2.

As tape 1 leaves the read mechanism it is stored in an accordion-pleated fashion in storage compartment 2. To insure proper operation structure is provided for refolding and extracting tape 1, maintaining each layer of tape in proper position. To accomplish this it is essential that each layer of tape maintains its original creases each time it is extracted for reading or recording, and refolded. For example, crease 40 of tape 1 is maintained at the same place on tape 1, abutting the edge of vertical wall 3 as it is stored in storage compartment 2. Vertical walls 3 and 4 may be vertically adjusted in accordance with the amount of tape stored. Supplementary folds in tape 1 are prevented by the structure comprising platforms 5 and 6 of storage compartment 2. Both platforms 5 and 6 extend from vertical walls 3 and 4 in a depressed or downward position, each having curved ends 9 and 10. Opening 8 provided therebetween allows tape 1 to be drawn from the bottom layers to be utilized again by the read mechanism. Tape is extracted from storage compartment 2 in layer pairs, a layer pair comprising portions such as $1_a$ and $1_b$. In a preferred embodiment weight is carried to a greater extent by the outer surfaces of the support (the outer ends near vertical walls 5 and 6). The lesser upward or gravity force exerted at the center of the layer stack (because of opening 8) causes the tape to form a concave upward position in storage compartment 2. In order to further insure an absence of supplemetnary folds, the tape is extracted from the bottom of layer stack 41 two portions at a time. Such result is facilitated in the device of the invention because of the downward extending position of platforms 5 and 6. Thus, as shown in FIG. 1, for example, portion $1_a$ of tape 1 and portion $1_b$ of a succeeding layer are both extracted at the same time. However, it is obvious portion $1_b$ is that portion fed through aperture 11 to associated rollers after portion $1_a$ passes through such aperture. Portion $1_b$ is drawn down through the opening 8 and assumes a semicircular position. After portion $1_a$ passes through aperture 11, portion $1_b$ passes therethrough. This tends to prevent any supplemental folds from being created. Upon the finishing of the passing of portion $1_b$ through aperture 11, then the next pair of portions comprising the portion $1_c$ connected to portion $1_b$ and the succeeding portion of the next layer are extracted for use by the recorder.

In order to insure that the tape 1 refolds properly in storage compartment 2 as it leaves the producing mechanism, blowers 31 and 32 are provided at opposite ends to provide an air force upon the tape 1 as it leaves pressure roller 20. Blowers 31 and 32 are positioned a predetermined distance above the tape stack to provide the proper force on the tape. To refold properly it is required that the distance between the driving point at capstan 19 and the nesting point, for example 40, of the previous fold be less than the distance between folds. As the next fold leaves the capstan, compressional stress within the tape will cause the deflection of the next fold to be in a direction away from the position of the previous fold. This action is repeated with each fold. The result is a refolding of the tape atop the layer stack in the storage compartment. The upper level of the layer stack remains approximately constant since an equal amount of tape is continuously being extracted from the bottom of the stack. Reliability in refolding is achieved by blowers 31 and 32 which insure that the curve on the tape as it leaves the capstan is concave upward. Small jets of air from blowers 31 and 32 are blown onto the tape.

Turning now to FIG. 2 there is shown the structure of this invention in perspective form with the reproducer illustrated in opened portions FIG. 2(*a*) and FIG. 2(*b*). FIG. 2 illustrates in open perspective the compact and simple structure containing the reader of this invention. Frame 7 of FIG. 1 consists of panel 51 in FIG. 2(*a*) holding read mechanism 17 and in FIG. 2(*b*) cannister structure 52 holding storage compartment 2 and associated tape 1 and rollers 12, 13, 14, and 15. Rollers 12 and 15 may be located on either panel 51 or cannister 52. Cannister 52 is mounted in place on panel 51 by locating pins 54 and 55. Lock-in handle 56 holds cannister 52 firmly against panel 51.

The tape handling device of this invention and the embodiment illustrated in FIGS. 1 and 2 is particularly adaptable to handling a large amount of tape at a high speed. Six hundred feet of tape being read at a speed of 800 lines per second have been achieved utilizing the device of FIG. 1. The ability to handle this large amount of tape at a high speed is particularly due to the storage compartment structure and the means for folding and unfolding the tape from the storage compartment. Thus in FIG. 1 the operation wherein tape is extracted in portion pairs through opening 8 is particularly adapted to high speed operation. Additionally, symmetry of operation in folding the tape is provided by the positioning of capstan 19 and roller 20 of the read mechanism substantially in line with the center of opening 8. Also, aperture 11 is located below opening 8 and centrally positioned with respect thereto.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a gravity assisted tape reproducer system adapted for use with a creased endless tape in which a portion of said tape is stored in accordion-pleated layers fashion while the remainder is driven past a read head, retaining means for supporting said tape, said retaining means comprising a pair of identical platform supports, each said platform support being depressed having an upper and a lower end, a pair of vertical walls attached to said upper ends against which the left and right ends respectively of said tape can abut as said tape is folded upon said supports, each of said lower ends having a downwardly extended curved lip, said retaining means having an opening larger than the length of either of said platform supports between said curved lips whereby tape may be withdrawn downwardly through said opening two layers at a time.

2. A gravity assisted handler for folding tape which has folds only at equally spaced positions along the tape, comprising: a retainer for supporting layers of said folded tape, said retainer comprising a pair of tape supporting platforms spaced apart and inclined downwardly in a direction toward each other to provide a tape withdrawal space therebetween which is larger than the length of either one of said platforms; drive means for pulling tape downwardly off said platforms two layers at a time through said space between said platforms and returning tape to be folded above said platforms, said drive means including guide means positioned below said platforms and disposed equi-distantly between said platforms; and drive means positioned above and centrally disposed substantially equi-distant from said platforms, said guide means cooperating with said tape for withdrawal of said tape through said space and said last mentioned drive means returning said tape to said platforms.

3. In a gravity assisted tape reproducer adapted for use with a creased endless tape in which a portion of said tape is stored in accordian-pleated layer fashion while the remainder is driven past a read head, retaining means for supporting said tape, said retaining means comprising a pair of identical platform supports, each said platform support being depressed and having an upper and lower end, a pair of vertical walls attached to said upper ends against which the left and right ends respectively of said tape can abut as said tape is folded upon said supports, each of said lower ends having a downwardly extending curved lip, said retaining means having an opening larger than the length of either of said platform supports between said curved lips, first and second blower means directed from each side of the tape at the two uppermost layers to aid refolding as said layers are stored in said retaining means.

4. A gravity assisted handler for folded tape having folds only at predetermined positions along the tape, comprising: a retainer for said folding tape, said retainer comprising a pair of tape supporting platforms spaced apart and inclined downwardly in a direction toward each other to provide a tape withdrawal opening therebetween which is larger than the length of either one of said platforms, first drive means for pulling tape downwardly off said platforms two layers at a time through said opening between said platforms; second drive means positioned above and centrally disposed substantially equidistant from said platforms, said second drive means delivering said tape to said platforms; gas conduit means, symmetrically disposed with respect to said platforms, delivering continuous jets of gas downward and centrally to aid the folding of said tape.

5. A gravity assisted handler for folding tape which has folds only at equally spaced positions along the tape, comprising: a retainer for supporting layers of said folded tape, said retainer comprising a pair of tape supporting platforms spaced apart and inclined downwardly in a direction toward each other to provide a tape withdrawal space therebetween which is larger than the length of either one of said platforms; first drive means for pulling tape downwardly off said platforms two layers at a time through said space between said platforms and returning tape to be folded above said platforms, said drive means including guide means positioned below said platforms and disposed equidistantly between said platforms; second drive means positioned above and centrally disposed substantially equidistant from said platforms, said guide means cooperating with said tape for withdrawal of said tape through said space, and said second drive means returning said tape to said platform; and blower means positioned above said layers and respectively directed at the two uppermost layers to aid said folding.

References Cited in the file of this patent

UNITED STATES PATENTS

| | | |
|---|---|---|
| 1,833,987 | Lasowsky | Oct. 25, 1932 |
| 2,551,198 | Barrett | May 1, 1951 |
| 2,678,173 | Phelps | May 11, 1954 |
| 2,699,089 | Jakobs et al. | Jan. 11, 1955 |
| 2,721,371 | Hodkinson et al. | Oct. 25, 1955 |
| 2,809,082 | Marcuse | Oct. 8, 1957 |
| 2,865,639 | Gillette et al. | Dec. 23, 1958 |

FOREIGN PATENTS

| | | |
|---|---|---|
| 945,672 | Germany | July 12, 1956 |

UNITED STATES PATENT OFFICE

CERTIFICATE OF CORRECTION

Patent No. 3,123,269 March 3, 1964

Robert I. Morley et al.

It is hereby certified that error appears in the above numbered patent requiring correction and that the said Letters Patent should read as corrected below.

Column 2, line 24, for "speed" read -- spaced --; column 4, lines 3 and 4, for "supplemetnary" read -- supplementary --; line 23, for "producing" read -- reproducing --.

Signed and sealed this 14th day of July 1964.

(SEAL)

Attest:

ESTON G. JOHNSON
Attesting Officer

EDWARD J. BRENNER
Commissioner of Patents